(12) United States Patent
Nagashima et al.

(10) Patent No.: US 8,224,542 B2
(45) Date of Patent: Jul. 17, 2012

(54) AUTOMATIC TRANSMISSION AND CONTROL METHOD THEREOF

(75) Inventors: Fumitaka Nagashima, Fuji (JP);
Takateru Kawaguchi, Shizuoka (JP);
Shinya Mochiyama, Fuji (JP);
Yoshihide Shinso, Shizuoka (JP)

(73) Assignee: JATCO Ltd, Fuji-shi (JP)

( * ) Notice: Subject to any disclaimer, the term of this patent is extended or adjusted under 35 U.S.C. 154(b) by 1177 days.

(21) Appl. No.: 12/038,097

(22) Filed: Feb. 27, 2008

(65) Prior Publication Data

US 2008/0221764 A1    Sep. 11, 2008

(30) Foreign Application Priority Data

Mar. 9, 2007 (JP) ................. 2007-060442
Mar. 9, 2007 (JP) ................. 2007-060476

(51) Int. Cl.
*F16H 61/00* (2006.01)
(52) U.S. Cl. ........................ 701/63; 477/107
(58) Field of Classification Search .......... 701/63, 701/51, 54, 67, 87; 477/107, 166, 180, 115, 477/906, 74, 77, 86
See application file for complete search history.

(56) References Cited

U.S. PATENT DOCUMENTS

| | | | | |
|---|---|---|---|---|
| 5,129,287 A | * | 7/1992 | Asada et al. | 477/115 |
| 5,251,733 A | * | 10/1993 | Falck et al. | 477/79 |
| 5,409,434 A | * | 4/1995 | Furukawa et al. | 477/131 |
| 5,515,272 A | | 5/1996 | Sakai et al. | |
| 7,107,134 B1 | | 9/2006 | Melby et al. | |

FOREIGN PATENT DOCUMENTS

| | | |
|---|---|---|
| JP | 11-280886 A | 10/1999 |
| JP | 2000-240785 A | 9/2000 |
| JP | 2003-269602 A | 9/2003 |
| JP | 2006-336669 A | 12/2006 |

* cited by examiner

*Primary Examiner* — Dalena Tran
(74) *Attorney, Agent, or Firm* — Foley & Lardner LLP

(57) ABSTRACT

In an automatic transmission of this invention, a determination as to whether or not a failure has occurred in a friction element is made repeatedly while a vehicle is traveling, and control to specify the failed friction element is begun when a vehicle speed falls to or below a predetermined value for the first time following detection of the failure in the friction element (S1, S3). When the failed friction element has been specified (S4, S13, S15, S24, S26, S35, S37), usable gear positions are determined on the basis of the specified friction element, whereupon shift control is performed using only the usable gear positions (S5, S14, S16, S25, S27, S36, S38, S39).

16 Claims, 10 Drawing Sheets

|  | B1<br>Fr/B | C1<br>I/C | C2<br>D/C | C3<br>H&LR/C | B2<br>LOW/B | B3<br>2346/B | B4<br>R/B | F1 | F2 |
|---|---|---|---|---|---|---|---|---|---|
| 1st | (○) |  |  | (○) | ○ |  |  | ○ | ○ |
| 2nd |  |  |  | (○) | ○ | ○ |  |  | ○ |
| 3rd |  |  | ○ |  | ○ | ○ |  |  |  |
| 4th |  |  | ○ | ○ |  | ○ |  |  |  |
| 5th |  | ○ | ○ | ○ |  |  |  |  |  |
| 6th |  | ○ |  | ○ |  | ○ |  |  |  |
| 7th | ○ | ○ |  | ○ |  |  |  | ○ |  |
| Rev. | ○ |  |  | ○ |  |  | ○ |  |  |

*F I G . 3*

US 8,224,542 B2

AUTOMATIC TRANSMISSION AND CONTROL METHOD THEREOF

TECHNICAL FIELD OF THE INVENTION

This invention relates to failed element specification control employed when a failure occurs in a friction element of a stepped automatic transmission.

BACKGROUND OF THE INVENTION

A stepped automatic transmission comprises a planetary gear mechanism and a plurality of friction elements, and switches a gear position by switching an engagement state of each friction element such that a desired gear position is obtained.

It is known that when a release failure or an engagement failure occurs in a friction element in this type of automatic transmission, control is performed to specify the failed friction element in order to secure drivability.

For example, in a technique disclosed in JP11-280886A, characteristic data generated when a failure occurs in a friction element are stored in advance for each gear position, and on the basis of these stored data and an actual speed ratio, the failed friction element and the manner of the failure, i.e. whether the failure is a release failure or an engagement failure, are specified.

SUMMARY OF THE INVENTION

In the conventional technique described above, a normal/abnormal determination is executed only once on each friction element immediate after an ignition has been switched on, and when a normal determination is made, the normal/abnormal determination is not executed until the ignition is turned on again, or in other words until the current driving cycle is complete. Hence, when a failure occurs in a friction element during travel, an abnormal determination is not made until the ignition is turned on again, and therefore a large period of time is required to specify the friction element, leading to deterioration of the drivability. When a failure occurs in a vehicle, the driver often leaves the ignition on out of concern that it may be impossible to restart the engine, and in this case, the problem described above is aggravated.

It is an object of this invention to specify a failed element by detecting the occurrence of a failure early, thereby suppressing deterioration of the drivability to a minimum.

In order to achieve this object, this invention provides an automatic transmission which has a planetary gear and a plurality of friction elements, and in which a directed gear position is achieved by switching an engagement/release state of the plurality of friction elements, and the directed gear position is one of a plurality of gear positions. The automatic transmission comprises: failure detecting means for detecting repeatedly whether or not a release failure or an engagement failure has occurred in the friction elements while a vehicle is traveling, a release failure occurring when the friction element cannot be engaged even when an engagement command is output thereto and an engagement failure occurring when the friction element cannot be released even when a release command is output thereto; failed element specification control means for beginning control to specify the failed friction element when a vehicle speed falls to or below a predetermined value for the first time after a failure has been detected by the failure detecting means; and limp home control means for determining usable gear positions on the basis of the specified friction element when the failed friction element has been specified by the failed element specification control means, and performing shift control using only the usable gear positions.

According to this invention, a determination as to whether or not a failure has occurred in a friction element is made repeatedly while the vehicle is traveling, and control to specify the failed friction element is begun when the vehicle speed falls to or below the predetermined value for the first time following detection of the failure in the friction element. Hence, the time required to detect the failure in the friction element after the failure occurs and specify the failed friction element can be shortened. Accordingly, limp home control can be started more quickly, and therefore deterioration of the drivability can be suppressed to a minimum.

Embodiments and advantages of this invention will be described in detail below with reference to the attached drawings.

BRIEF DESCRIPTION OF THE DRAWINGS

FIG. 3 is an engagement table showing an engagement state of each friction element at each gear position.

DESCRIPTION OF THE PREFERRED EMBODIMENT

An embodiment of this invention will be described in detail below with reference to the drawings.

Figure 1:
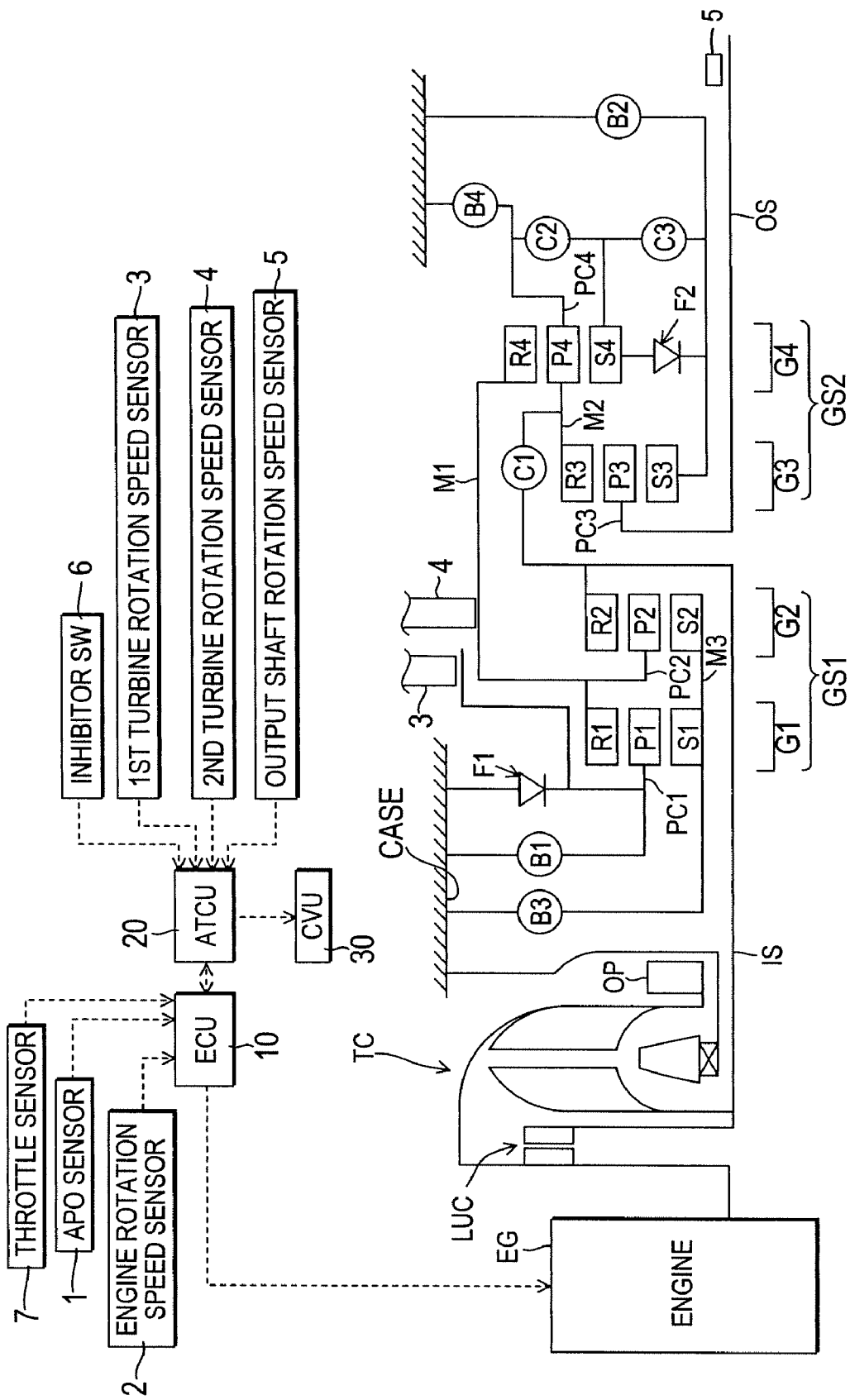
FIG. 1 is a skeleton diagram showing the constitution of an automatic transmission according to an embodiment.

FIG. 1 is a skeleton diagram showing the constitution of an automatic transmission according to this embodiment. The automatic transmission of this embodiment is a stepped automatic transmission having seven forward speeds and one reverse speed, in which a drive force of an engine EG is input from an input shaft IS via a torque converter TC, varied in rotation speed by four planetary gears and seven friction elements, and output from an output shaft OS. An oil pump OP is provided coaxially with a pump impeller of the torque converter TC and driven to rotate by the drive force of the engine EG such that oil is pressurized.

An engine controller (ECU) 10 that controls a driving state of the engine EG, an automatic transmission controller (ATCU) 20 that controls a gear position and so on of the automatic transmission and a control valve unit (CVU) 30 that controls an oil pressure of each friction element on the basis of an output signal from the ATCU 20 are also provided. The ECU 10 and ATCU 20 are connected via a CAN communication line or the like, and share sensor information and control information with each other through communication.

An APO sensor 1 that detects an accelerator pedal operation amount generated by a driver, an engine rotation speed sensor 2 that detects an engine rotation speed and a throttle sensor 7 that detects a throttle opening are connected to the ECU 10. The ECU 10 controls a fuel injection amount and the throttle opening on the basis of the engine rotation speed and accelerator pedal operation amount, and thereby controls the engine rotation speed and the torque.

A first turbine rotation speed sensor 3 that detects a rotation speed of a first carrier PC1, a second turbine rotation speed sensor 4 that detects a rotation speed of a first ring gear R1 and an inhibitor switch 6 that detects a shift lever operation state generated by the driver are connected to the ATCU 20. In a D range, the ATCU 20 selects an optimum directed gear position based on a vehicle speed Vsp and an accelerator pedal operation amount APO, and outputs a control command for achieving the directed gear position to the control valve unit CVU.

Next, a gear mechanism that transmits the rotation of the input shaft IS to the output shaft OS while changing the speed thereof will be described. A first planetary gear set GS1 and a second planetary gear set GS2 are disposed in the gear mechanism in order from the input shaft IS side to the output shaft OS side in an axial direction. The gear mechanism is also provided with a plurality of clutches C1, C2, C3 and brakes B1, B2, B3, B4 serving as friction elements, and a plurality of one-way clutches F1, F2.

A first planetary gear G1 is a single pinion planetary gear having a first sun gear S1, the first ring gear R1, and the first carrier PC1, which supports a first pinion P1 that meshes with the two gears S1, R1. A second planetary gear G2 is a single pinion planetary gear having a second sun gear S2, a second ring gear R2, and a second carrier PC2 supporting a second pinion P2 that meshes with the two gears S2, R2. A third planetary gear G3 is a single pinion planetary gear having a third sun gear S3, a third ring gear R3, and a third carrier PC3 supporting a third pinion P3 that meshes with the two gears S3, R3. A fourth planetary gear G4 is a single pinion planetary gear having a fourth sun gear S4, a fourth ring gear R4, and a fourth carrier PC4 supporting a fourth pinion P4 that meshes with the two gears S4, R4.

The input shaft IS is connected to the second ring gear R2 and inputs a rotational drive force of the engine EG via the torque converter TC and so on. The output shaft OS is connected to the third carrier PC3 and transmits an output rotational drive force to a drive wheel via a final gear and so on.

A first linking member M1 links the first ring gear R1, second carrier PC2 and fourth ring gear R4 integrally. A second linking member M2 links the third ring gear R3 and fourth carrier PC4 integrally. A third linking member M3 links the first sun gear S1 and second sun gear S2 integrally.

The first planetary gear set GS1 links the first planetary gear G1 and second planetary gear G2 using the first linking member M1 and third linking member M3, and is constituted by four rotary elements. The second planetary gear set GS2 links the third planetary gear G3 and fourth planetary gear G4 using the second linking member M2, and is constituted by five rotary elements.

In the first planetary gear set GS1, torque is input into the second ring gear R2 from the input shaft IS, and the input torque is output to the second planetary gear set GS2 via the first linking member M1. In the second planetary gear set GS2, torque is input directly into the second linking member M2 from the input shaft IS and also input into the fourth ring gear R4 via the first linking member M1, and the input torque is output to the output shaft OS from the third carrier PC3.

An input clutch C1 selectively connects and disconnects the input shaft IS and the second linking member M2. A direct clutch C2 selectively connects and disconnects the fourth sun gear S4 and the fourth carrier PC4.

An H&LR clutch C3 selectively connects and disconnects the third sun gear S3 and the fourth sun gear S4. Further, a second one-way clutch F2 is disposed between the third sun gear S3 and fourth sun gear S4. Therefore, when the H&LR clutch C3 is released and the rotation speed of the fourth sun gear S4 is higher than that of the third sun gear S3, the third sun gear S3 and fourth sun gear S4 generate independent rotation speeds. As a result, the third planetary gear G3 and fourth planetary gear G4 are connected via the second linking member M2, and the respective planetary gears achieve independent speed ratios.

A front brake B1 selectively stops the first carrier PC1 from rotating. Further, the first one-way clutch F1 is disposed in parallel with the front brake B1. A low brake B2 selectively stops the third sun gear S3 from rotating. A 2346 brake B3 selectively stops the third linking member M3 linking the first sun gear S1 and second sun gear S2 from rotating. A reverse brake B4 selectively stops the fourth carrier PC4 from rotating.

Figure 2:
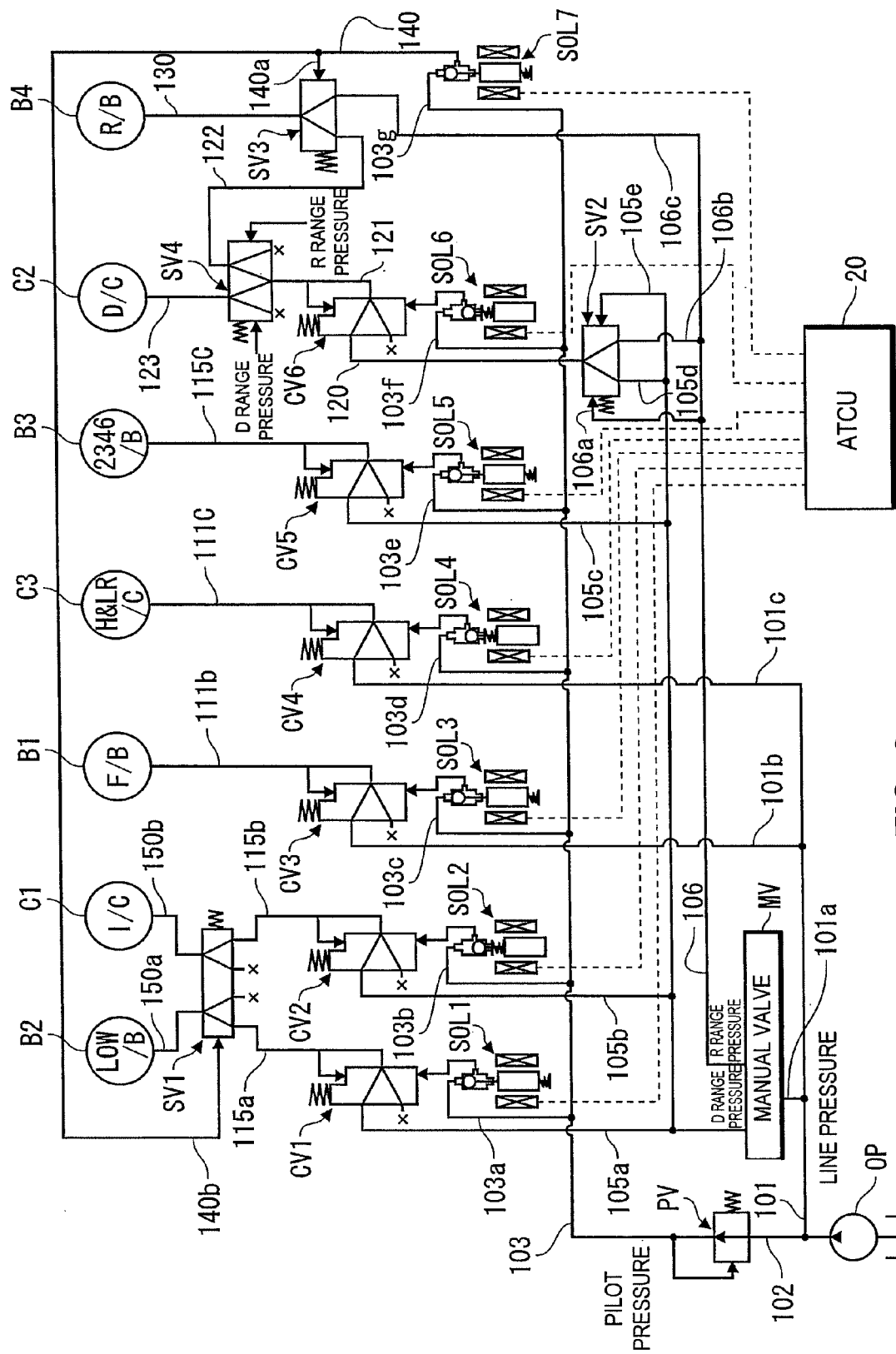
FIG. 2 is a circuit diagram illustrating a hydraulic circuit of a CVU.

Next, referring to FIG. 2, a hydraulic circuit of the CVU 30 will be described. FIG. 2 is a circuit diagram illustrating a hydraulic circuit of the CVU.

The hydraulic circuit is provided with the oil pump OP, which serves as an oil pressure source driven by the engine, a manual valve MV that operates in conjunction with a shift lever operation by the driver to switch an oil passage for supplying a line pressure PL, and a pilot valve PV that reduces the line pressure to a predetermined fixed pressure.

The hydraulic circuit is also provided with a first pressure regulating valve CV1 that regulates an engagement pressure of the low brake B2, a second pressure regulating valve CV2 that regulates an engagement pressure of the input clutch C1, a third pressure regulating valve CV3 that regulates an engagement pressure of the front brake B1, a fourth pressure regulating valve CV4 that regulates an engagement pressure of the H&LR clutch C3, a fifth pressure regulating valve CV5 that regulates an engagement pressure of the 2346 brake B3, and a sixth pressure regulating valve CV6 that regulates an engagement pressure of the direct clutch C2.

The hydraulic circuit is also provided with a first switching valve SV1 that switches only one of a supply oil passage leading to the low brake B2 and a supply oil passage leading to the input clutch C1 to a communicating state, a second switching valve SV2 that switches only one of a supply oil passage for supplying a D range pressure to the direct clutch C2 and a supply oil passage for supplying an R range pressure to the direct clutch C2 to a communicating state, a third switching valve SV3 that switches an oil pressure supplied to the reverse brake B4 between a supply oil pressure from the sixth pressure regulating valve CV6 and a supply oil pressure from the R range pressure, and a fourth switching valve SV4 for switching an oil pressure output by the sixth pressure regulating valve CV6 between an oil passage 123 and an oil passage 122.

The hydraulic circuit is also provided with a first solenoid valve SOL1 that outputs a pressure regulating signal to the first pressure regulating valve CV1, a second solenoid valve SOL2 that outputs a pressure regulating signal to the second pressure regulating valve CV2, a third solenoid valve SOL3 that outputs a pressure regulating signal to the third pressure regulating valve CV3, a fourth solenoid valve SOL4 that outputs a pressure regulating signal to the fourth pressure regulating valve CV4, a fifth solenoid valve SOL5 that outputs a pressure regulating signal to the fifth pressure regulating valve CV5, a sixth solenoid valve SOL6 that outputs a pressure regulating signal to the sixth pressure regulating valve CV6, and a seventh solenoid valve SOL7 that outputs a switching signal to the first switching valve SV1 and the third switching valve SV3, these signals being output on the basis of a control signal from the ATCU 20.

A discharge pressure of the oil pump OP driven by the engine is regulated to the line pressure and then supplied to an oil passage 101 and an oil passage 102. An oil passage 101a connected to the manual valve MV, which operates in conjunction with a shift lever operation by the driver, an oil passage 101b that supplies a source pressure of the engagement pressure of the front brake B1, and an oil passage 101c that supplies a source pressure of the engagement pressure of the H&LR clutch C3 are connected to the oil passage 101.

An oil passage 105 and an oil passage 106 that supplies the R range pressure selected during reverse traveling are connected to the manual valve MV. The manual valve MV switches between the oil passage 105 and the oil passage 106 in accordance with the shift lever operation.

An oil passage 105a that supplies a source pressure of the engagement pressure of the low brake B2, an oil passage 105b that supplies a source pressure of the engagement pressure of the input clutch C1, an oil passage 105c that supplies a source pressure of the engagement pressure of the 2346 brake B3, an oil passage 105d that supplies a source pressure of the engagement pressure of the direct clutch C2, and an oil passage 105e that supplies a switching pressure of the second switching valve SV2, to be described below, are connected to the oil passage 105.

An oil passage 106a that supplies the switching pressure of the second switching valve SV2, an oil passage 106b that supplies the source pressure of the engagement pressure of the direct clutch C2, and an oil passage 106c that supplies an engagement pressure of the reverse brake B4 are connected to the oil passage 106.

An oil passage 103 that supplies a pilot pressure via the pilot valve PV is connected to the oil passage 102. An oil passage 103a that supplies the pilot pressure to the first solenoid valve SOL1, an oil passage 103b that supplies the pilot pressure to the second solenoid valve SOL2, an oil passage 103c that supplies the pilot pressure to the third solenoid valve SOL3, an oil passage 103d that supplies the pilot pressure to the fourth solenoid valve SOL4, an oil passage 103e that supplies the pilot pressure to the fifth solenoid valve SOL5, an oil passage 103f that supplies the pilot pressure to the sixth solenoid valve SOL5, and an oil passage 103g that supplies the pilot pressure to the seventh solenoid valve SOL7 are provided on the oil passage 103.

Figure 4:
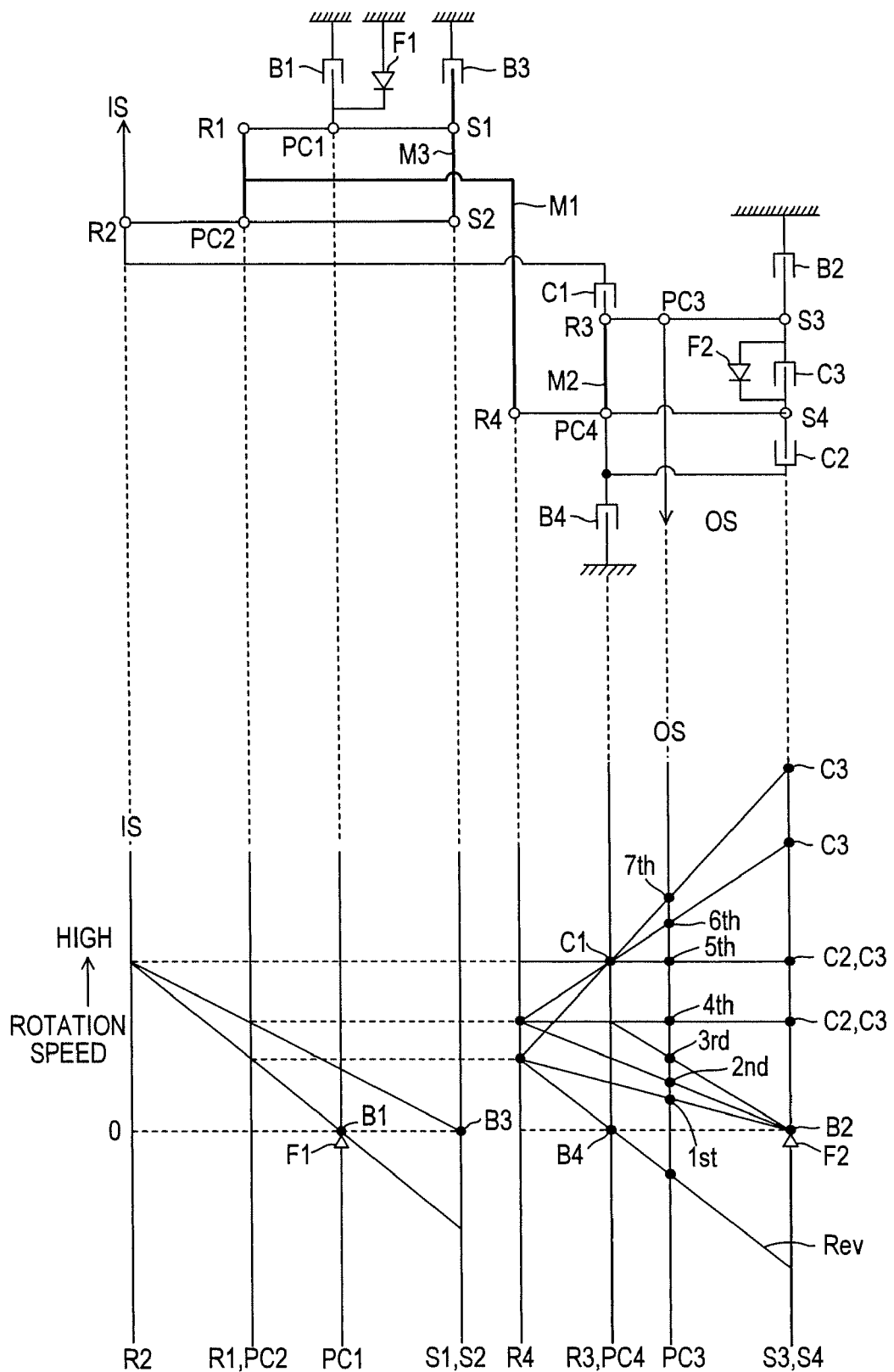
FIG. 4 is an alignment chart showing a rotational state of each rotary element at each gear position.

Next, an operation of the gear mechanism will be described with reference to FIGS. 3 and 4. FIG. 3 is an engagement table showing the engagement state of each friction element at each gear position, a circle indicating that the corresponding friction element is engaged, and a circle in parentheses indicating that the corresponding friction element is engaged when a range position in which an engine brake operates has been selected. FIG. 4 is an alignment chart showing the rotational state of each rotary member at each gear position.

In a first speed, only the low brake B2 is engaged, and the first one-way clutch F1 and second one-way clutch F2 are engaged. During an engine brake operation, the front brake B1 and the H&LR clutch C3 are also engaged.

When the first one-way clutch F1 is engaged, the first carrier PC1 stops rotating, and therefore the rotation that is input into the second ring gear R2 from the input shaft IS is reduced in speed by the first planetary gear set GS1 and then output to the fourth ring gear R4 from the first linking member M1. Further, when the low brake B2 is engaged and the second one-way clutch F2 is engaged, the third sun gear S3 and fourth sun gear S4 stop rotating, and therefore the rotation that is input into the fourth ring gear R4 is reduced in speed by the second planetary gear set GS2 and then output from the third carrier PC3.

In other words, as shown by the alignment chart in FIG. 4, the rotation of the input shaft IS is reduced in speed by the first planetary gear set GS1, further reduced in speed by the second planetary gear set GS2, and then output from the output shaft OS.

In a second speed, the low brake B2 and the 2346 brake B3 are engaged, and the second one-way clutch F2 is engaged. During an engine brake operation, the H&LR clutch C3 is also engaged.

When the 2346 brake B3 is engaged, the first sun gear S1 and second sun gear S2 stop rotating, and therefore the rotation that is input into the second ring gear R2 from the input shaft IS is reduced in speed by the second planetary gear G2 alone and then output to the fourth ring gear R4 from the first linking member M1. Further, when the low brake B2 is engaged and the second one-way clutch F2 is engaged, the third sun gear S3 and fourth sun gear S4 stop rotating, and therefore the rotation that is input into the fourth ring gear R4 is reduced in speed by the second planetary gear set GS2 and then output from the third carrier PC3.

In other words, as shown by the alignment chart in FIG. 4, the rotation of the input shaft IS is reduced in speed by the first planetary gear set GS1, further reduced in speed by the second planetary gear set GS2, and then output from the output shaft OS.

In a third speed, the low brake B2, 2346 brake B3 and direct clutch C2 are engaged.

When the 2346 brake B3 is engaged, the first sun gear S1 and second sun gear S2 stop rotating, and therefore the rotation that is input into the second ring gear R2 from the input shaft IS is reduced in speed by the second planetary gear G2 and then output to the fourth ring gear R4 from the first linking member M1. Further, when the direct clutch C2 is engaged, the fourth planetary gear G4 rotates integrally. The fourth planetary gear G4 therefore contributes to torque transmission but does not contribute to the speed reduction action. Further, when the low brake B2 is engaged, the third sun gear S3 stops rotating, and therefore the rotation that is input into the third ring gear R3 from the fourth carrier PC4, which rotates integrally with the fourth ring gear R4, via the second linking member M2 is reduced in speed by the third planetary gear G3 and then output from the third carrier PC3.

In other words, as shown by the alignment chart in FIG. 4, the rotation of the input shaft IS is reduced in speed by the first planetary gear set GS1, further reduced in speed by the third planetary gear G3 of the second planetary gear set GS2, and then output from the output shaft OS.

In a fourth speed, the 2346 brake B3, direct clutch C2 and H&LR clutch C3 are engaged.

When the 2346 brake B3 is engaged, the first sun gear S1 and second sun gear S2 stop rotating, and therefore the rotation that is input into the second ring gear R2 from the input shaft IS is reduced in speed by the second planetary gear G2 alone and then output to the fourth ring gear R4 from the first linking member M1. Further, when the direct clutch C2 and the H&LR clutch C3 are engaged, the second planetary gear set GS2 rotates integrally, and therefore the rotation that is input into the fourth ring gear R4 is output from the third carrier PC3 as is.

In other words, as shown by the alignment chart in FIG. 4, the rotation of the input shaft IS is reduced in speed by the first planetary gear set GS1 and then output from the output shaft OS without being reduced in speed by the second planetary gear set GS2.

In a fifth speed, the input clutch C1, direct clutch C2 and H&LR clutch C3 are engaged.

When the input clutch C1 is engaged, the rotation of the input shaft IS is input directly into the second linking member M2. Further, when the direct clutch C2 and the H&LR clutch C3 are engaged, the second planetary gear set GS2 rotates integrally, and therefore the rotation of the input shaft IS is output from the third carrier PC3 as is.

In other words, as shown by the alignment chart in FIG. 4, the rotation of the input shaft IS is output from the output shaft OS as is, without being reduced in speed by either the first planetary gear set GS1 or the second planetary gear set GS2.

In a sixth speed, the input clutch C1, H&LR clutch C3 and 2346 brake B3 are engaged.

When the input clutch C1 is engaged, the rotation of the input shaft IS is input into the second ring gear and also input directly into the second linking member M2. Further, when the 2346 brake B3 is engaged, the first sun gear S1 and second sun gear S2 stop rotating, and therefore the rotation of the input shaft IS is reduced in speed by the second planetary gear G2 and then output to the fourth ring gear R4 from the first linking member M1.

Further, when the H&LR clutch C3 is engaged, the third sun gear S3 and fourth sun gear S4 rotate integrally, and therefore the second planetary gear set GS2 outputs rotation that has been decided by the rotation of the fourth ring gear R4 and the rotation of the second linking member M2 from the third carrier PC3.

In other words, as shown by the alignment chart in FIG. 4, a part of the rotation of the input shaft IS is reduced in speed by the first planetary gear set GS1, increased in speed by the second planetary gear set GS2, and then output from the output shaft OS.

In a seventh speed, the input clutch C1, H&LR clutch C3 and front brake B1 are engaged, and the first one-way clutch F1 is engaged.

When the input clutch C1 is engaged, the rotation of the input shaft IS is input into the second ring gear R2 and also input directly into the second linking member M2. Further, when the front brake B1 is engaged, the first carrier PC1 stops rotating, and therefore the rotation of the input shaft IS is reduced in speed by the first planetary gear set GS1 and then output to the fourth ring gear R4 from the first linking member M1.

Further, when the H&LR clutch C3 is engaged, the third sun gear S3 and fourth sun gear S4 rotate integrally, and therefore the second planetary gear set GS2 outputs rotation that has been decided by the rotation of the fourth ring gear R4 and the rotation of the second linking member M2 from the third carrier PC3.

In other words, as shown by the alignment chart in FIG. 4, a part of the rotation of the input shaft IS is reduced in speed by the first planetary gear set GS1, increased in speed by the second planetary gear set GS2, and then output from the output shaft OS.

In a reverse speed, the H&LR clutch C3, front brake B1 and reverse brake B4 are engaged.

When the front brake B1 is engaged, the first carrier PC1 stops rotating, and therefore the rotation of the input shaft IS is reduced in speed by the first planetary gear set GS1 and then output to the fourth ring gear R4 from the first inking member M1.

Further, when the H&LR clutch C3 is engaged, the third sun gear S3 and fourth sun gear S4 rotate integrally, and when the reverse brake B4 is engaged, the second linking member M2 stops rotating. Therefore, in the second planetary gear set GS2, the rotation of the fourth ring gear R4 is transmitted in reverse to the fourth sun gear S4, third sun gear S3 and third carrier PC3, and then output from the third carrier PC3.

In other words, as shown by the alignment chart in FIG. 4, the rotation of the input shaft IS is reduced in speed by the first planetary gear set GS1, reversed in the second planetary gear set GS2, and then output from the output shaft OS.

The automatic transmission is constituted as described above, and switching is performed between the first and seventh speeds to a desired gear position in accordance with a shift line set on the basis of the vehicle speed and throttle opening. When a failure occurs in one of the friction elements at this time, it becomes impossible to achieve the desired gear position, and as a result, the drivability deteriorates. Control performed in the ATCU 20 when a failure occurs in a friction element will now be described with reference to the flowchart in FIGS. 5A-5C.

Figure 5A:
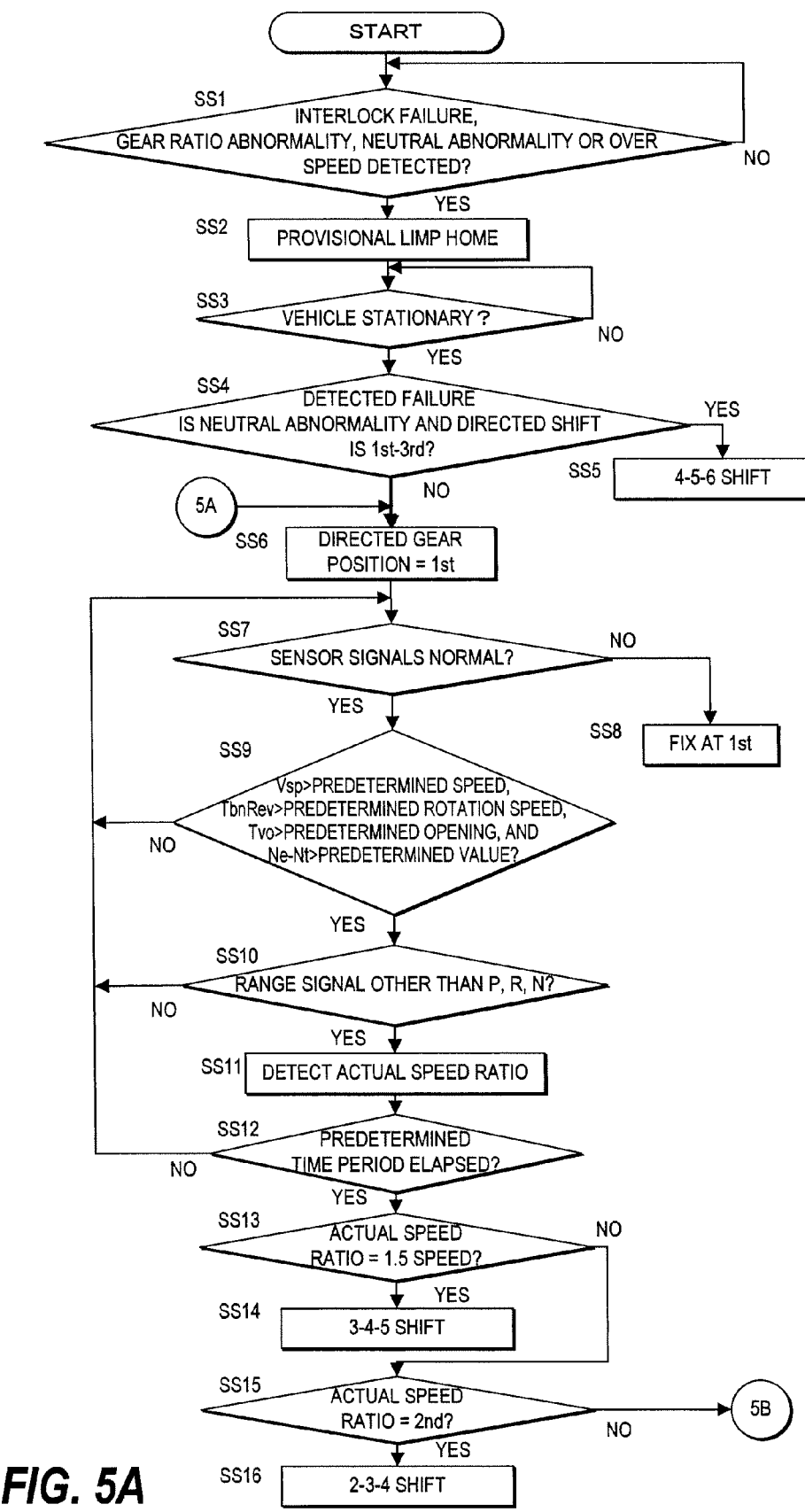
FIGS. 5A-5C are flowcharts showing control of the automatic transmission according to this embodiment.
Figure 5B:
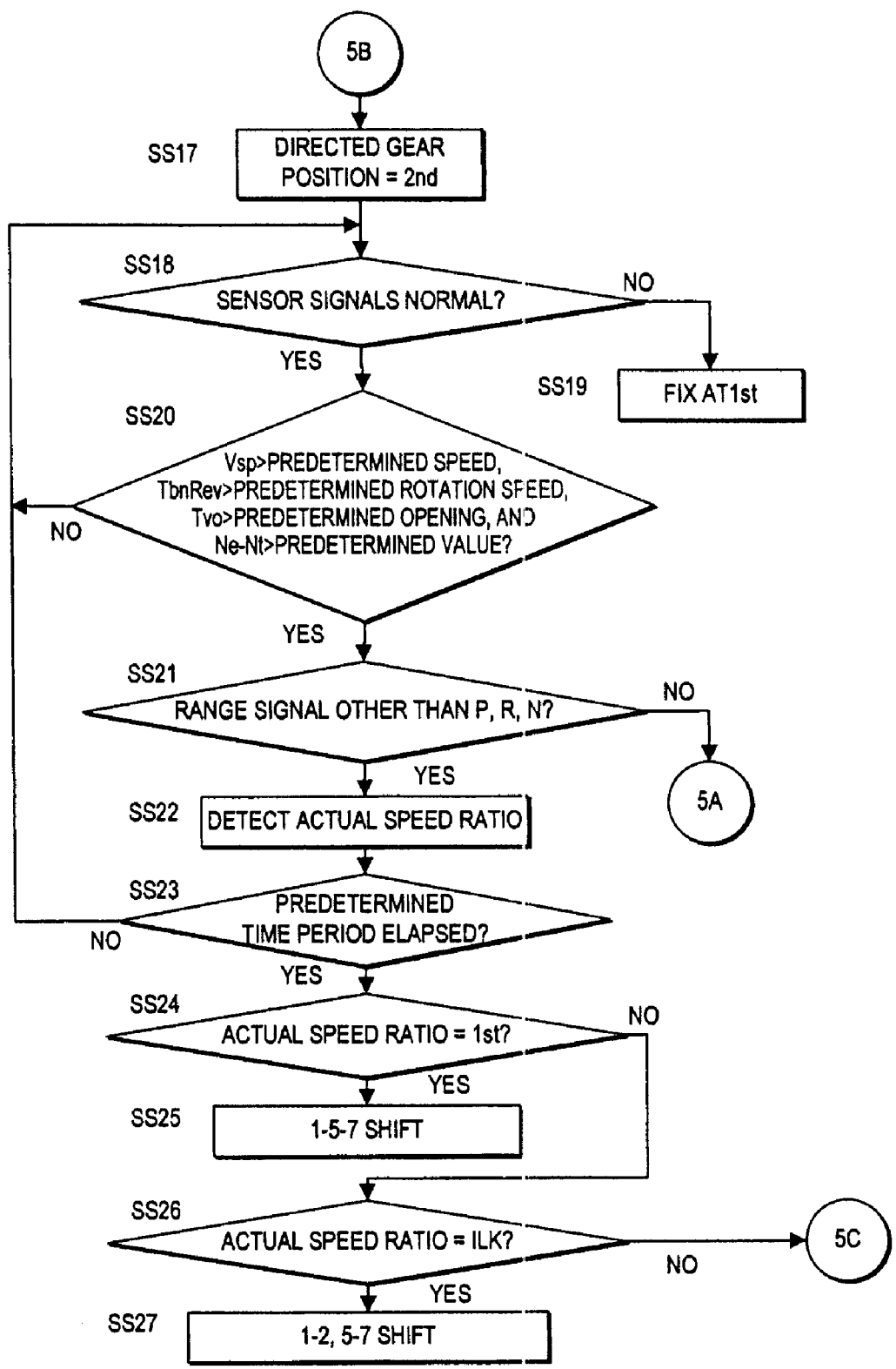
Figure 5C:
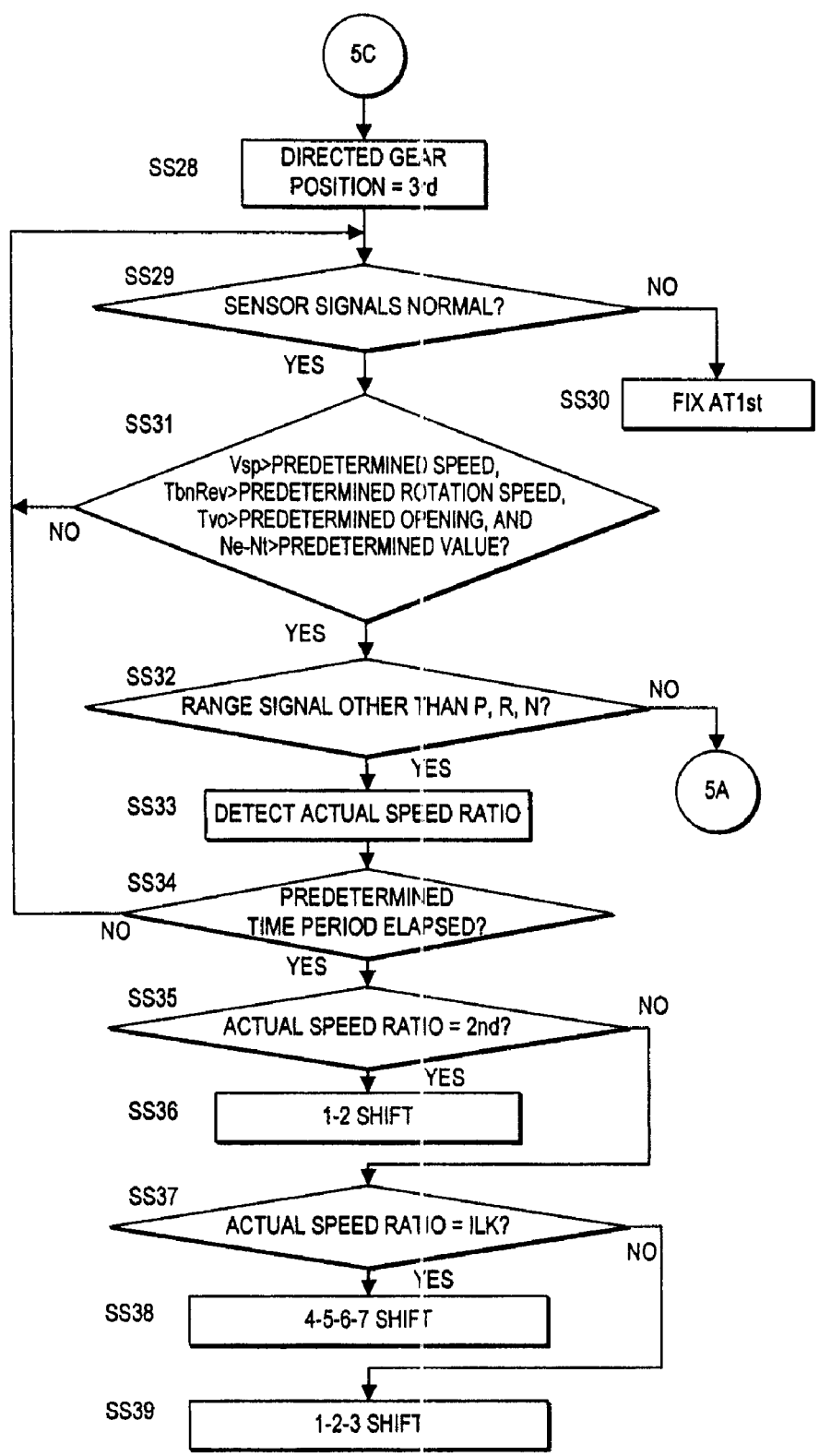

FIGS. 5A-5C are flowcharts showing control of the automatic transmission according to this embodiment. This control is performed when a failure occurs in one of the friction elements of the automatic transmission to specify the failed friction element, determine whether the failure is a release failure or an engagement failure, and perform limp home control in accordance with the element of the failure and the manner of the failure. It should be noted that a release failure is a failure occurring when a friction element to which an engagement command has been output does not engage completely and remains released, while an engagement failure is a failure occurring when a friction element to which a release command has been output is not released and remains engaged.

In a step SS1, a determination is made as to whether or not any of an interlock failure, a speed ratio abnormality, a neutral abnormality, and over speed has been detected. When one of these abnormalities is detected, the routine advances to a step SS2, and when none of the abnormalities is detected, the step SS1 is executed again.

An interlock failure denotes a state relating to a friction element engagement command, in which a friction element to which an engagement command has not been issued engages such that the rotation of the input shaft IS or output shaft OS of the transmission is locked. An interlock failure is detected when a deceleration rate of the vehicle reaches or exceeds a predetermined value despite the brake being inoperative, for example.

A neutral abnormality denotes a state relating to a friction element engagement command, in which a part of the friction elements to which engagement commands have been issued do not engage such that the power of the input shaft is not transmitted to the output shaft. A neutral abnormality is detected when an actual speed ratio becomes larger than the speed ratio of the directed gear position by a predetermined value or more, for example.

A speed ratio abnormality denotes a state relating to a friction element engagement command, in which the engagement capacity of a friction element is insufficient or a friction element to which an engagement command has not been issued has surplus engagement capacity. A speed ratio abnormality is detected when the actual speed ratio deviates from the speed ratio of the directed gear position by a predetermined value or more and a neutral abnormality is not detected, for example.

Over speed denotes a state in which the rotation speed of a rotary member other than the input shaft IS and output shaft OS increases to a rotation speed that cannot be obtained when the directed gear position is achieved normally. Over speed is detected when the rotation speed of a predetermined rotary member is detected directly or indirectly to have reached or exceeded a predetermined value, for example.

In the step SS2, provisional limp home is performed in accordance with the failure or abnormality detected in the step SS1. Provisional limp home is performed by fixing the gear position at a gear position other than the gear position at which the failure or abnormality was detected, for example.

In a step SS3, a determination is made as to whether or not the vehicle is stationary. When the vehicle is stationary, the routine advances to a step SS4, and when the vehicle is not stationary, the step SS3 is executed again. It should be noted that the vehicle is determined to be stationary by determining whether or not the vehicle speed has reached or fallen below a predetermined vehicle speed (5 km/h, for example).

In the step SS4, determinations are made as to whether or not the failure detected in the step SS1 is a neutral abnormality and whether or not the directed gear position at the time of detection is between the first and third speeds. When these conditions are satisfied, the routine advances to a step SS5, where shift control is performed using the fourth, fifth and sixth speeds as main limp home. When the failure is not a neutral abnormality or the directed gear position is not between the first and third speeds, the routine advances to a step SS6.

When the detected failure is a neutral abnormality and the directed gear position at the time of detection is between the first and third speeds, it can be assumed that a release failure has occurred in the low brake B2, which is always in an engaged state in the first through third speeds, and therefore shift control is performed using the fourth, fifth and sixth speeds and avoiding the first through third speeds that use the low brake B2.

In the control to be described below, probe control is performed to specify the element of the failure by setting the directed gear position from the first speed to the third speed and determining whether or not the actual gear position indicates a normal value relative to the directed gear position.

In the step SS6, the directed gear position is set at the first speed. Here, the directed gear position is set at the first speed regardless of the vehicle speed and throttle opening. In steps SS17 and SS28 to be described below, the directed gear position is similarly fixed at the second and third speeds, respectively. In other words, upshifts or downshifts based on the vehicle speed and throttle opening are prohibited during execution of the steps from this step onward.

In a step SS7, a determination is made as to whether or not the respective signals of an output shaft rotation speed sensor 5, the first turbine rotation speed sensor 3, the second turbine rotation speed sensor 4, the throttle sensor 7, the engine rotation speed sensor 2 and the inhibitor switch 6 are normal. When the signals are normal, the routine advances to a step SS9, and when a signal is abnormal, the routine advances to a step SS8, where the directed gear position is fixed at the first speed, after which travel is continued at the first speed.

When the directed gear position is set at the first speed, an engagement command is issued to the low brake B2. In this state, even when an engagement failure occurs in another friction element, the actual speed ratio simply shifts to a speed ratio other than the speed ratio corresponding to the first speed, and a further failure such as interlocking does not occur. Hence, by fixing the directed gear position at the first speed when a signal abnormality occurs such that the failed element cannot be specified accurately, a situation in which limp home is performed erroneously, leading to deterioration of the drivability and excessive wear on the friction elements, does not arise.

In the step SS9, respective determinations are made as to whether or not the vehicle speed Vsp is higher than a predetermined speed, whether or not a rotation speed TbnREV of a turbine runner is higher than a predetermined rotation speed, whether or not an opening Tvo of a throttle valve is greater than a predetermined opening, and whether or not a value Ne−Nt obtained by subtracting the rotation speed of the turbine runner from the engine rotation speed is greater than a predetermined value. When all of these conditions are satisfied, the routine advances to a step SS10, and when any one of the conditions is not satisfied, the routine returns to the step SS7.

When the output shaft OS of the transmission does not rotate, the speed ratio cannot be detected accurately, and therefore the predetermined speed is set at a value that makes it possible to determine that the vehicle speed is sufficient to enable accurate detection of the speed ratio. Similarly, when the input shaft IS of the transmission does not rotate, the speed ratio cannot be detected accurately, and therefore the predetermined rotation speed is set at a value that makes it possible to determine that the turbine runner is rotating at a rotation speed enabling accurate detection of the speed ratio. Further, the predetermined opening and the predetermined value are set such that it is possible to determine that the drive force of the engine EG is being transmitted from the input shaft IS of the transmission to the output shaft OS, or in other words such that it is possible to determine that the vehicle is in a driving state rather than a coasting state.

In the step SS10, a determination is made as to whether or not a range signal indicates a range other than P, R and N. When the range signal indicates a range other than P, R and N, i.e. a forward traveling range, the routine advances to a step SS11, and when the range signal indicates one of P, R and N, the routine returns to the step SS7.

Engagement failures due to valve sticking often occur in a friction element when contamination or the like becomes trapped between a spool and a valve body bore of a pressure regulating valve that regulates the oil pressure of the friction element. When this type of failure occurs and the range is shifted from the forward traveling range to the P, R and N ranges, the oil pressure is discharged through a manual port, leading to large variation in the oil pressure acting on the pressure regulating valve, and as a result, the spool may separate from the valve body, thereby eliminating the engagement failure. Hence, when the range shifts from the forward traveling range to the P, R and N ranges during execution of this control, data obtained up to this point are reset and the control is performed anew.

In the step SS11, the actual speed ratio is detected. The actual speed ratio is calculated by dividing the rotation speed of the input shaft IS by the rotation speed of the output shaft OS of the transmission.

In a step SS12, a determination is made as to whether or not a predetermined time period has elapsed after setting the directed gear position at the first speed. The predetermined time period is set at a sufficient amount of time to exclude a case in which the conditions of the step SS9 are satisfied temporarily, for example two seconds.

Figure 6:
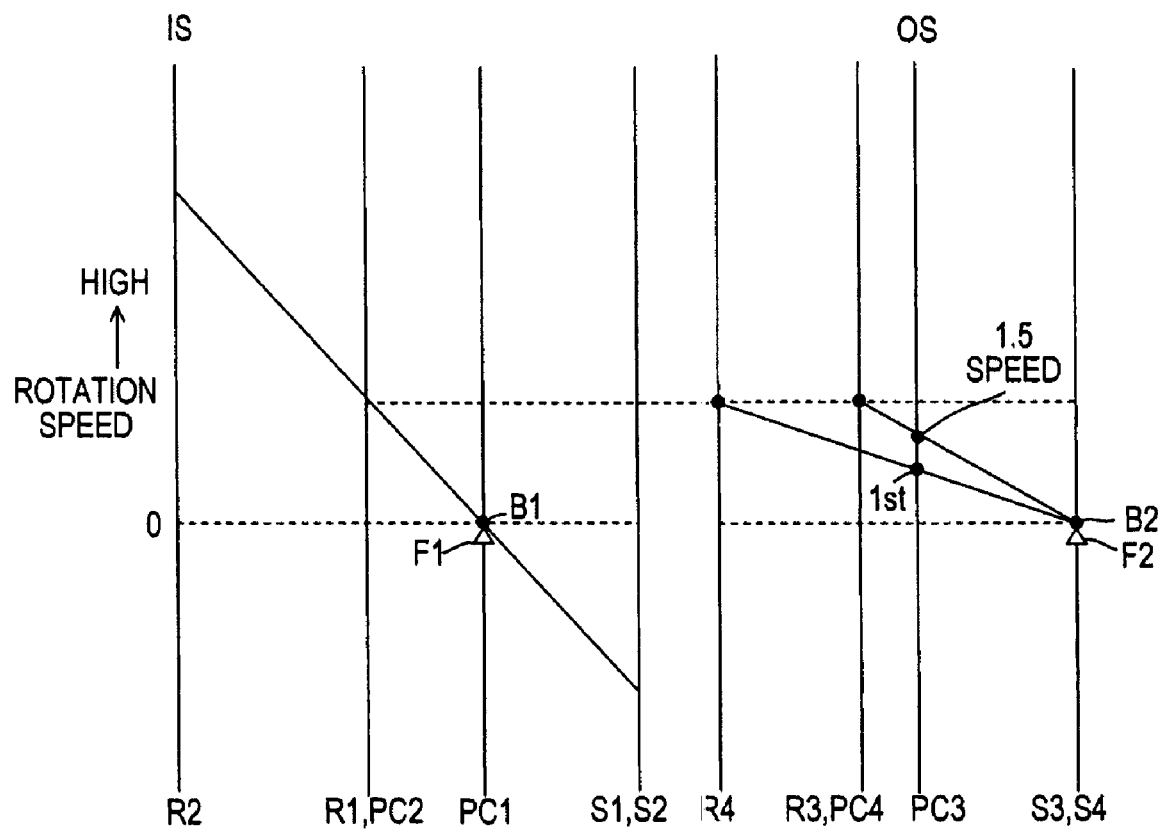
FIG. 6 is an alignment chart showing the rotational state of each rotary element at a first speed and a 1.5 speed.

In a step SS13, a determination is made as to whether or not the actual speed ratio corresponds to a 1.5 speed. When the actual speed ratio corresponds to the 1.5 speed, the routine advances to a step SS14, where shift control is performed using the third, fourth and fifth speeds as the main limp home, and when the actual speed ratio does not correspond to the 1.5 speed, the routine advances to a step SS15. Here, the actual speed ratio comes to correspond to the 1.5 speed when the low brake B2, first one-way clutch F1 and direct clutch C2 are engaged, as shown in the alignment chart in FIG. 6. Since the current directed gear position is the first speed and an engagement command has only been output to the low brake B2, it may be determined that an engagement failure has occurred in the direct clutch C2. Therefore, shift control is performed using only the third, fourth and fifth speeds, i.e. the gear positions in which the direct clutch C2 is engaged.

In the step SS15, a determination is made as to whether or not the actual speed ratio corresponds to the second speed. When the actual speed ratio corresponds to the second speed, the routine advances to a step SS16, where shift control is performed using the second, third and fourth speeds as the main limp home, and when the actual speed ratio does not correspond to the second speed, the routine advances to a step SS17. Here, the actual speed ratio comes to correspond to the second speed, even though the directed gear position is the first speed, when an engagement failure occurs in the 2346 brake, as can be seen by comparing the first and second speeds in the engagement table of FIG. 3, and therefore shift control is performed using only the second, third and fourth speeds from among the gear positions in which the 2346 brake is engaged.

In the step SS17, the directed gear position is set at the second speed.

In a step SS18, a determination is made as to whether or not the respective signals of the output shaft rotation speed sensor 5, first turbine rotation speed sensor 3, second turbine rotation speed sensor 4, throttle sensor 7, engine rotation speed sensor 2 and inhibitor switch 6 are normal. When the signals are normal, the routine advances to a step SS20, and when a signal is abnormal, the routine advances to a step SS19, where the directed gear position is fixed at the first speed.

In the step SS20, respective determinations are made as to whether or not the vehicle speed Vsp is higher than the predetermined speed, whether or not the rotation speed TbnREV of the turbine runner is higher than the predetermined rotation speed, whether or not the opening Tvo of the throttle valve is greater than the predetermined opening, and whether or not the value Ne−Nt obtained by subtracting the rotation speed of the turbine runner from the engine rotation speed is greater than the predetermined value. When all of these conditions are satisfied, the routine advances to a step SS21, and when any one of the conditions is not satisfied, the routine returns to the step SS18.

In the step SS21, a determination is made as to whether or not the range signal indicates a range other than P, R and N. When the range signal indicates a range other than P, R and N, i.e. the forward traveling range, the routine advances to a step SS22, and when the range signal indicates one of P, R and N, the routine returns to the step SS6.

As described above in the step SS10, an engagement failure in a friction element may be eliminated when the range shifts from the forward traveling range to the P, R and N ranges, and in this case, if the control routine is continued while holding a result obtained in the failed element specification control of the steps SS6 to SS16, which is performed with the directed gear position set at the first speed, excessive control may be executed, leading to deterioration of the drivability. Hence, when the range shifts from the forward traveling range to the P, R and N ranges, the directed gear position is reset at the first speed and the failed element specification control is performed again from the beginning.

In the step SS22, the actual speed ratio is detected.

In a step SS23, a determination is made as to whether or not a predetermined time period has elapsed after setting the directed gear position at the second speed. If the predetermined time period has elapsed, the routine advances to a step SS24, and if not, the routine returns to the step SS18.

In the step SS24, a determination is made as to whether or not the actual speed ratio corresponds to the first speed. When the actual speed ratio corresponds to the first speed, the routine advances to a step SS25, where shift control is performed using the first, fifth and seventh speeds as the main limp home, and when the actual speed ratio does not correspond to the first speed, the routine advances to a step SS26. Here, the actual speed ratio comes to correspond to the first speed, even though the directed gear position is the second speed, when a release failure occurs in the 2346 brake, as can be seen by comparing the first and second speeds in the engagement table of FIG. 3, and therefore shift control is performed using only the first, fifth and seventh speeds, i.e. the gear positions in which the 2346 brake is released.

In the step SS26, a determination is made as to whether or not the actual speed ratio is a speed ratio (ILK) corresponding to interlocking. When the actual speed ratio is the speed ratio corresponding to interlocking, the routine advances to a step SS27, where shift control is performed using the first, second, fifth and seventh speeds as the main limp home, and when the actual speed ratio is not the speed ratio corresponding to interlocking, the routine advances to a step SS28. In an interlock failure, the speed ratio decreases when the input shaft is locked and increases when the output shaft is locked, and therefore the actual speed ratio is determined to correspond to interlocking when it is larger than the speed ratio corresponding to the first speed or smaller than the speed ratio corresponding to the second speed.

Figure 7:
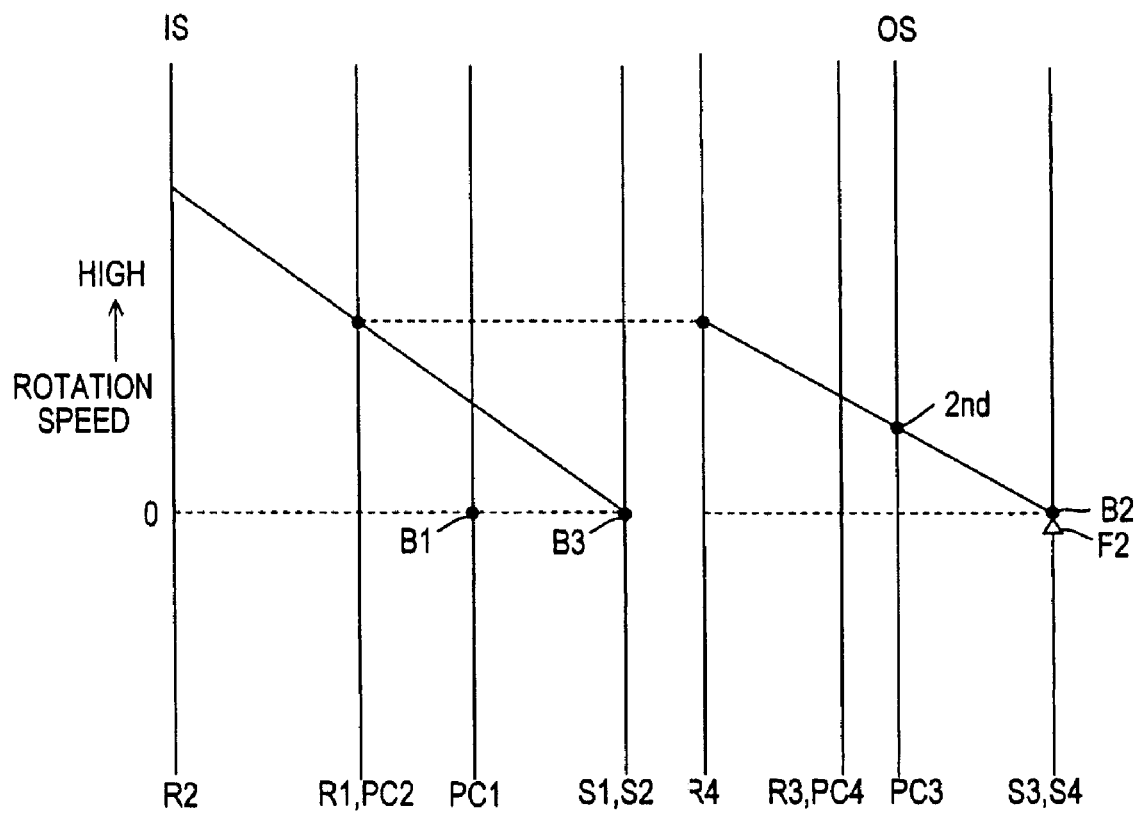
FIG. 7 is an alignment chart showing the rotational state of each rotary element at a second speed.

As shown in the alignment chart of FIG. 7, when the directed gear position is set at the second speed, engagement commands are output to the low brake B2 and the 2346 brake B3, and when an engagement failure occurs in the front brake B1 in this state, the first carrier PC1 stops rotating, causing the input shaft IS to lock such that an interlock failure occurs. Hence, shift control is performed using only the first, second, fifth and seventh speeds, i.e. the gear positions in which the front brake B1 is engaged.

In the step SS28, the directed gear position is set at the third speed.

In a step SS29, a determination is made as to whether or not the respective signals of the output shaft rotation speed sensor 5, first turbine rotation speed sensor 3, second turbine rotation speed sensor 4, throttle sensor 7, engine rotation speed sensor 2 and inhibitor switch 6 are normal. When the signals are normal, the routine advances to a step SS31, and when a signal is abnormal, the routine advances to a step SS30, where the directed gear position is fixed at the first speed.

In the step SS31, respective determinations are made as to whether or not the vehicle speed Vsp is higher than the predetermined speed, whether or not the rotation speed TbnREV of the turbine runner is higher than the predetermined rotation speed, whether or not the opening Tvo of the throttle valve is greater than the predetermined opening, and whether or not the value Ne−Nt obtained by subtracting the rotation speed of the turbine runner from the engine rotation speed is greater than the predetermined value. When all of these conditions are satisfied, the routine advances to a step SS32, and when any one of the conditions is not satisfied, the routine returns to the step SS29.

In the step SS32, a determination is made as to whether or not the range signal indicates a range other than P, R and N. When the range signal indicates a range other than P, R and N, i.e. the forward traveling range, the routine advances to a step SS33, and when the range signal indicates one of P, R and N, the routine returns to the step SS6.

In the step SS33, the actual speed ratio is detected.

In a step SS34, a determination is made as to whether or not a predetermined time period has elapsed after setting the directed gear position at the third speed. If the predetermined time period has elapsed, the routine advances to a step SS35, and if not, the routine returns to the step SS29.

In the step SS35, a determination is made as to whether or not the actual speed ratio corresponds to the second speed. When the actual speed ratio corresponds to the second speed, the routine advances to a step SS36, where shift control is performed using the first and second speeds as the main limp home, and when the actual speed ratio does not correspond to the second speed, the routine advances to a step SS37. Here, the actual speed ratio comes to correspond to the second speed, even though the directed gear position is the third speed, when a release failure occurs in the direct clutch C2, as can be seen by comparing the second and third speeds in the engagement table of FIG. 3, and therefore shift control is performed using only the first and second speeds from among the gear positions in which the direct clutch C2 is released.

In the step SS37, a determination is made as to whether or not the actual speed ratio is the speed ratio corresponding to interlocking. When the actual speed ratio is the speed ratio corresponding to interlocking, the routine advances to a step SS38, where shift control is performed using the fourth, fifth, sixth and seventh speeds as the main limp home, and when the actual speed ratio is not the speed ratio corresponding to interlocking, the routine advances to a step SS39.

Figure 8:
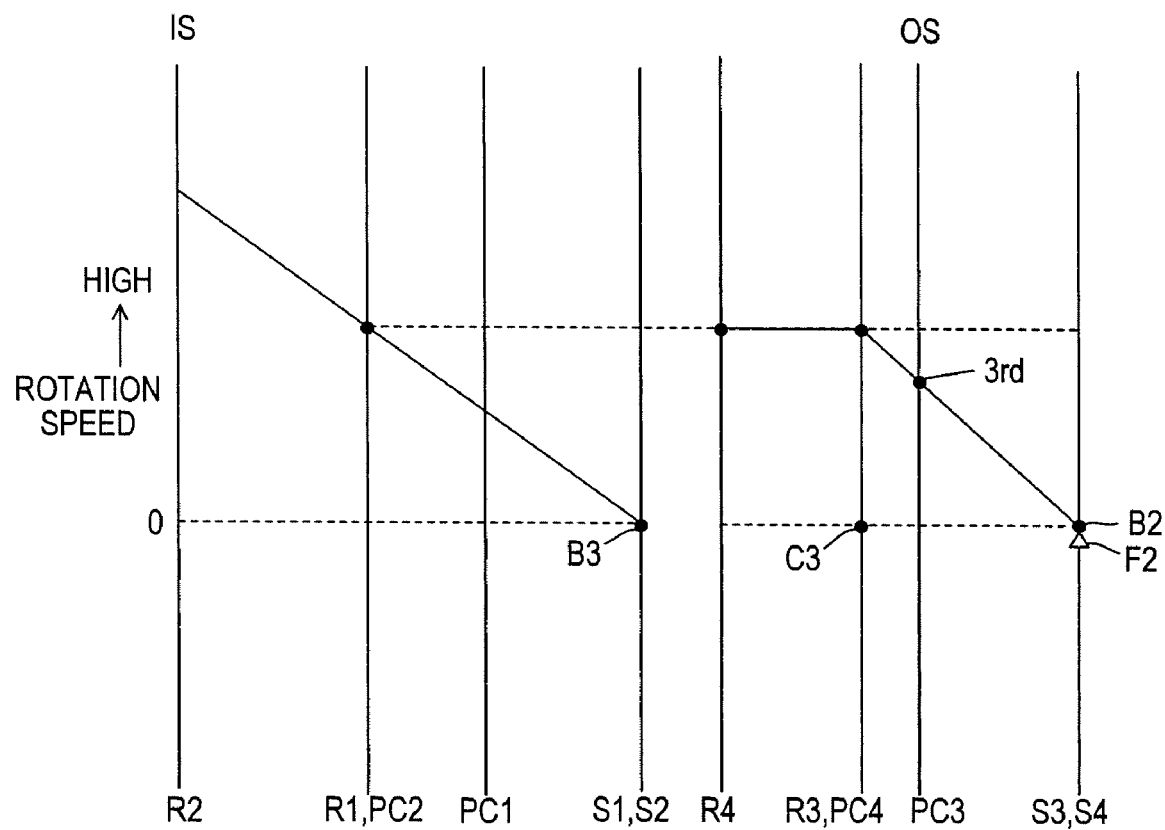
FIG. 8 is an alignment chart showing the rotational state of each rotary element at a third speed.

As shown in the alignment chart of FIG. 8, when the directed gear position is set at the third speed, engagement commands are output to the direct clutch C2, the low brake B2 and the 2346 brake B3, and when an engagement failure occurs in the H&LR clutch C3 in this state, the fourth carrier PC4 stops rotating, causing the output shaft OS to lock such that an interlock failure occurs. Hence, shift control is performed using only the fourth, fifth, sixth and seventh speeds, i.e. the gear positions at which the H&LR clutch C3 is engaged.

In the step SS39, shift control is performed using only the first, second and third speeds as the main limp home. Failures are deduced from the actual speed ratio, which is detected at each directed gear position from the first speed to the third speed, but when a failure is not detected in any of these cases, this step is executed, and as a result, the failure is assumed to be an engagement failure or a release failure in the input clutch C1 or a release failure in the H&LR clutch C3. Accordingly, shift control is performed using the first, second and third speeds, none of which are affected by these failures.

In the embodiment described above, determinations as to whether or not a failure has occurred in a friction element are performed repeatedly while the vehicle is running, and when a failure is detected in a friction element, control to specify the failed friction element is begun after the vehicle speed falls to or below a predetermined vehicle speed for the first time following the detection. Hence, the time required to detect a failure in a friction element after the failure occurs and specify the failed friction element can be shortened. Accordingly, limp home control can be started more quickly, and therefore deterioration of the drivability can be suppressed to a minimum.

Furthermore, when a failure is detected in a friction element, control is performed to specify the failed friction element while shifting the directed gear position sequentially from the first speed to the third speed, and when the failed friction element cannot be specified after shifting the gear position from the first speed to the third speed, shift control is performed using the first through third gear positions as limp home control. In other words, the directed gear position is not set at all seven gear positions in order to specify the failed friction element, and limp home control is begun after confining that a sufficient degree of drivability can be secured. Therefore, limp home control can be started quickly, and deterioration of the drivability can be suppressed to a minimum.

Furthermore, the failed friction element is specified while shifting the directed gear position sequentially to one or more gear positions selected from a plurality of gear positions, and when the failed friction element is specified, limp home control is performed without moving to the following selected gear position. Therefore, pointless control to shift the directed gear position sequentially after the failed friction element has been specified can be eliminated, and as a result, deterioration of the drivability can be suppressed even further.

Also, the failed friction element is specified on the basis of the directed gear position and the actual gear position, which is deducted from the actual speed ratio, and therefore the failed friction element can be specified early, without having to determine that the speed ratio has deviated from the directed gear position in all of the gear positions.

Moreover, when specifying the failed element, the directed gear position is shifted sequentially at predetermined time intervals, and therefore the gear position can be shifted reliably irrespective of the traveling conditions, in contrast to a case in which a shift instruction is issued on the basis of the vehicle speed and throttle opening. As a result, the friction element can be specified even earlier. When a failure occurs, the driver rarely presses the accelerator pedal, and therefore, if the directed gear position is shifted in accordance with the vehicle speed and throttle opening, a large period of time is required for the directed gear position to switch. According to this embodiment, however, the friction element can be specified early.

Furthermore, the directed gear position is shifted sequentially at predetermined time intervals and downshifts are prohibited. Therefore, the directed gear position can be shifted to the selected gear position reliably, and the failed friction element can be specified early.

Moreover, friction element specification is terminated when any one of conditions as to whether or not the vehicle speed Vsp is higher than the predetermined speed, whether or not the rotation speed TbnREV of the turbine runner is higher than the predetermined rotation speed, whether or not the opening Tvo of the throttle valve is greater than the predetermined opening, and whether or not the value Ne−Nt obtained by subtracting the rotation speed of the turbine runner from the engine rotation speed is greater than the predetermined value is not satisfied, and when these conditions are satisfied, friction element specification is resumed from the directed gear position at which specification of the friction element was terminated. Hence, when the conditions cease to be satisfied temporarily and are then satisfied again, specification is not resumed from a directed gear position that has already been set, and as a result, the failed friction element can be specified even earlier.

When the range signal is detected to indicate P, R and N, specification of the failed friction element is terminated, and when the range signal no longer indicates P, R and N, the directed gear position is returned to the first speed and control to specify the failed friction element is performed again from the beginning. Hence, when a temporary failure occurs in a friction element and the failure is eliminated by shifting the range position from the forward traveling range to the P, R and N ranges, the results of previous friction element specification control can be reset such that excessive control is not performed, and as a result, deterioration of the drivability can be suppressed.

This invention is not limited to the embodiment described above, and may be subjected to various alterations and modifications with the scope of the technical spirit thereof.

What is claimed is:

1. An automatic transmission which has a planetary gear and a plurality of friction elements, and in which a directed gear position is achieved by switching an engagement/release state of the plurality of friction elements, and the directed gear position is one of a plurality of gear positions, the transmission comprising:
a controller functioning to:
detect repeatedly whether or not a release failure or an engagement failure has occurred in the friction elements while a vehicle is traveling, a release failure occurring when one of the friction elements cannot be engaged even when an engagement command is output thereto and an engagement failure occurring when one of the friction elements cannot be released even when a release command is output thereto;
begin failed element specification control to specify the failed one of the friction elements as a specified friction element when a vehicle speed falls to or below a predetermined value for the first time after a failure has been detected, and
perform a limp home control which determines usable gear positions on the basis of the specified friction element when the failed one of the friction elements has been specified, and performs a shift control using only the usable gear positions.

2. The automatic transmission as defined in claim 1, wherein the controller further functions to:
in the failed element specification control, specify the failed one of the friction elements while shifting the directed gear position sequentially to gear positions selected from the plurality of gear positions, and
after specifying the failed one of the friction elements, hand control over to the limp home control without shifting the directed gear position to a subsequent selected gear position.

3. The automatic transmission as defined in claim 2, wherein the controller further functions to:
in the failed element specification control, shift the directed gear position sequentially to the selected gear positions at predetermined time intervals.

4. The automatic transmission as defined in claim 2, wherein the controller further functions to:
in the failed element specification control, prohibit a downshift while the directed gear position is shifted sequentially.

5. The automatic transmission as defined in claim 2, wherein the controller further functions to:
determine whether or not to prohibit specification of the failed one of the friction elements by the failed element specification control on the basis of an operating condition of the vehicle, and
in the failed element specification control, when specification of the failed one of the friction elements is determined to be prohibited, terminate specification of the failed one of the friction elements, and when the prohibition is lifted, specify the failed one of the friction elements while shifting the gear position sequentially from the directed gear position at which specification of the failed one of the friction elements was terminated.

6. The automatic transmission as defined in claim 2, further comprising a sensor which detects an operating position of a shift lever, wherein the controller further functions to:
in the failed element specification control, when the operating position of the shift lever is detected to be outside of a forward traveling range, terminate specification of the failed one of the friction elements, and when the operating position of the shift lever returns to the forward traveling range, specify the failed one of the friction elements while shifting the directed gear position sequentially to the selected gear positions from the beginning.

7. The automatic transmission as defined in claim 1, wherein the controller further functions to:
in the failed element specification control, specify the failed one of the friction elements on the basis of the directed gear position and an actual gear position deduced from an actually achieved speed ratio.

8. The automatic transmission as defined in claim I, wherein the controller further functions to:
in the failed element specification control, specify the failed one of the friction elements while shifting the directed gear position sequentially to a smaller number of gear positions than the number of gear positions in the plurality of gear positions, which have been selected from the plurality of gear positions, and
in the limp home control, perform shift control using only the selected gear positions when the failed one of the friction elements cannot be specified even after the failed element specification control have shifted the directed gear position to all of the selected gear positions.

9. The automatic transmission as defined in claim 8, wherein the controller further functions to:
in the failed element specification control, specify the failed one of the friction elements on the basis of the directed gear position and an actual gear position deduced from an actually achieved speed ratio.

10. The automatic transmission as defined in claim 8, wherein the controller further functions to:
in the failed element specification control, hand control over to the limp home control without shifting the directed gear position to a subsequent selected gear position after specifying the failed one of the friction elements.

11. The automatic transmission as defined in claim 8, wherein the controller further functions to:
in the failed element specification control, shift the directed gear position sequentially to the selected gear positions at predetermined time intervals.

12. The automatic transmission as defined in claim 8, wherein the controller further functions to:
in the failed element specification control, a downshift is prohibited while the directed gear position is shifted sequentially.

13. The automatic transmission as defined in claim 8, wherein the controller further functions to:
determine whether or not to prohibit specification of the failed one of the friction elements by the failed element specification control on the basis of an operating condition of the vehicle, and
in the failed element specification control, when specification of the failed one of the friction elements is determined to be prohibited, terminate specification of the failed one of the friction elements, and when the prohibition is lifted, and specify the failed one of the friction elements while shifting the gear position sequentially from the directed gear position at which specification of the failed one of the friction elements was terminated.

14. The automatic transmission as defined in claim 8, further comprising a sensor which detects an operating position of a shift lever, wherein the controller further functions to:

in the failed element specification control, when the operating position of the shift lever is detected to be outside of a forward traveling range, terminate specification of the failed one of the friction elements, and when the operating position of the shift lever returns to the forward traveling range, specify the failed one of the friction elements while shifting the directed gear position sequentially to the selected gear positions from the beginning.

15. A control method for an automatic transmission which has a planetary gear and a plurality of friction elements, and in which a directed gear position is achieved by switching an engagement/release state of the plurality of friction elements, and the directed gear position is one of a plurality of gear positions, the method comprising:

a failure detecting step, by an automatic transmission control unit, for detecting repeatedly whether or not a release failure or an engagement failure has occurred in the friction elements while a vehicle is traveling, a release failure occurring when one of the friction elements cannot be engaged even when an engagement command is output thereto and an engagement failure occurring when one of the friction elements cannot be released even when a release command is output thereto;

a failed element specification, by the automatic transmission control unit, control step for beginning control to specify the failed one of the friction elements as a specified friction element when a vehicle speed falls to or below a predetermined value for the first time after a failure has been detected by the failure detecting step; and a limp home control step, by the automatic transmission control unit, for determining usable gear positions on the basis of the specified friction element when the failed one of the friction elements has been specified by the failed element specification control step, and performing shift control using only the usable gear positions.

16. An automatic transmission which has a planetary gear and a plurality of friction elements, and in which a directed gear position is achieved by switching an engagement/release state of the plurality of friction elements, and the directed gear position is one of a plurality of gear positions, the transmission comprising:

means for detecting repeatedly whether or not a release failure or an engagement failure has occurred in the friction elements while a vehicle is traveling, a release failure occurring when one of the friction elements cannot be engaged even when an engagement command is output thereto and an engagement failure occurring when one of the friction elements cannot be released even when a release command is output thereto;

means for specifying the failed one of the friction elements when a vehicle speed falls to or below a predetermined value for the first time after a release or engagement failure has been detected; and means for determining usable gear positions when the failed one of the friction elements has been specified and for performing shift control using only the usable gear positions.

* * * * *